Oct. 4, 1966 W. TRANSUE 3,276,237
APPARATUS FOR STRAIGHTENING AUTOMOBILE BODIES
Filed Sept. 7, 1962 7 Sheets-Sheet 1
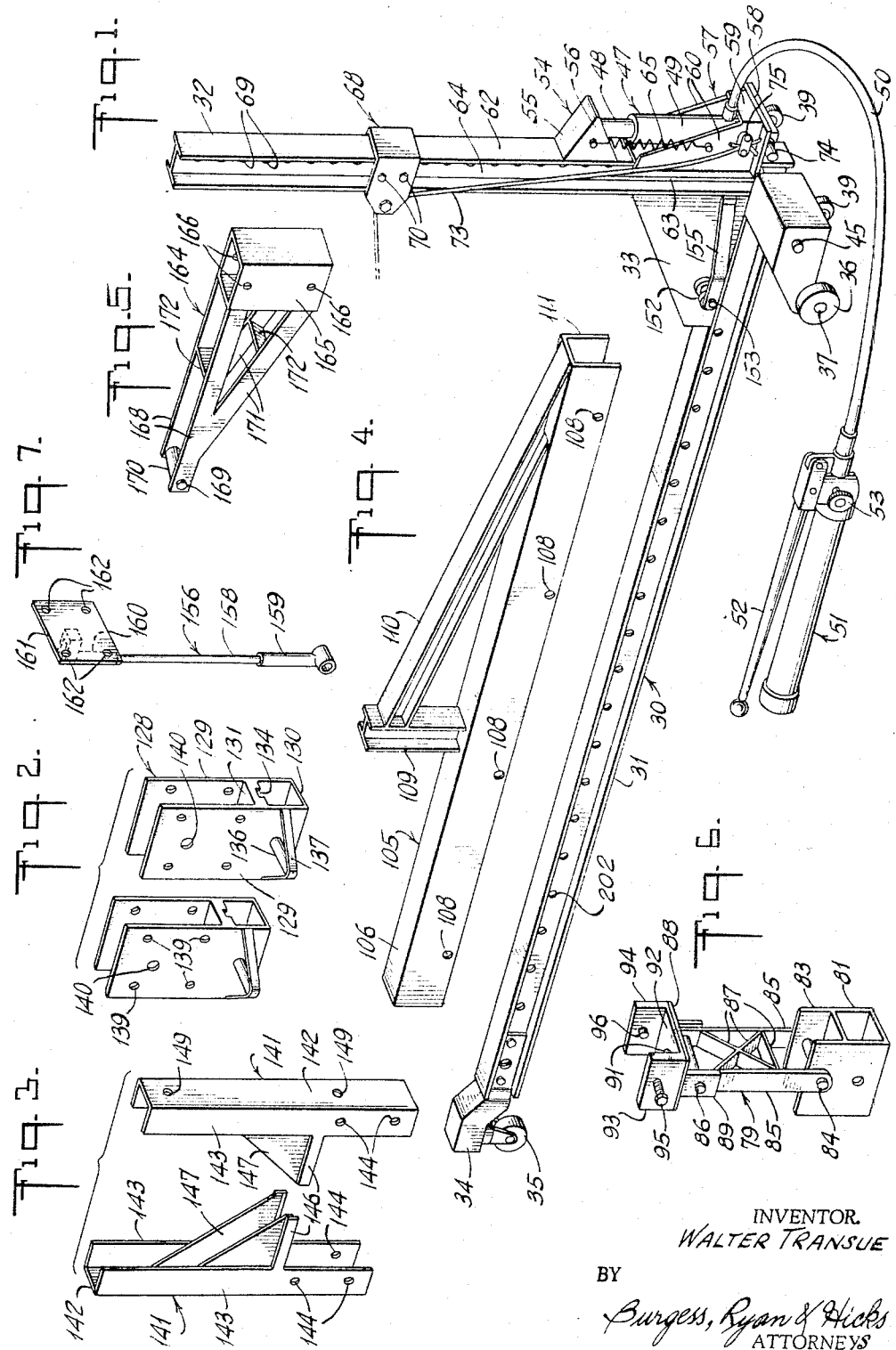
INVENTOR.
WALTER TRANSUE
BY
Burgess, Ryan & Hicks
ATTORNEYS

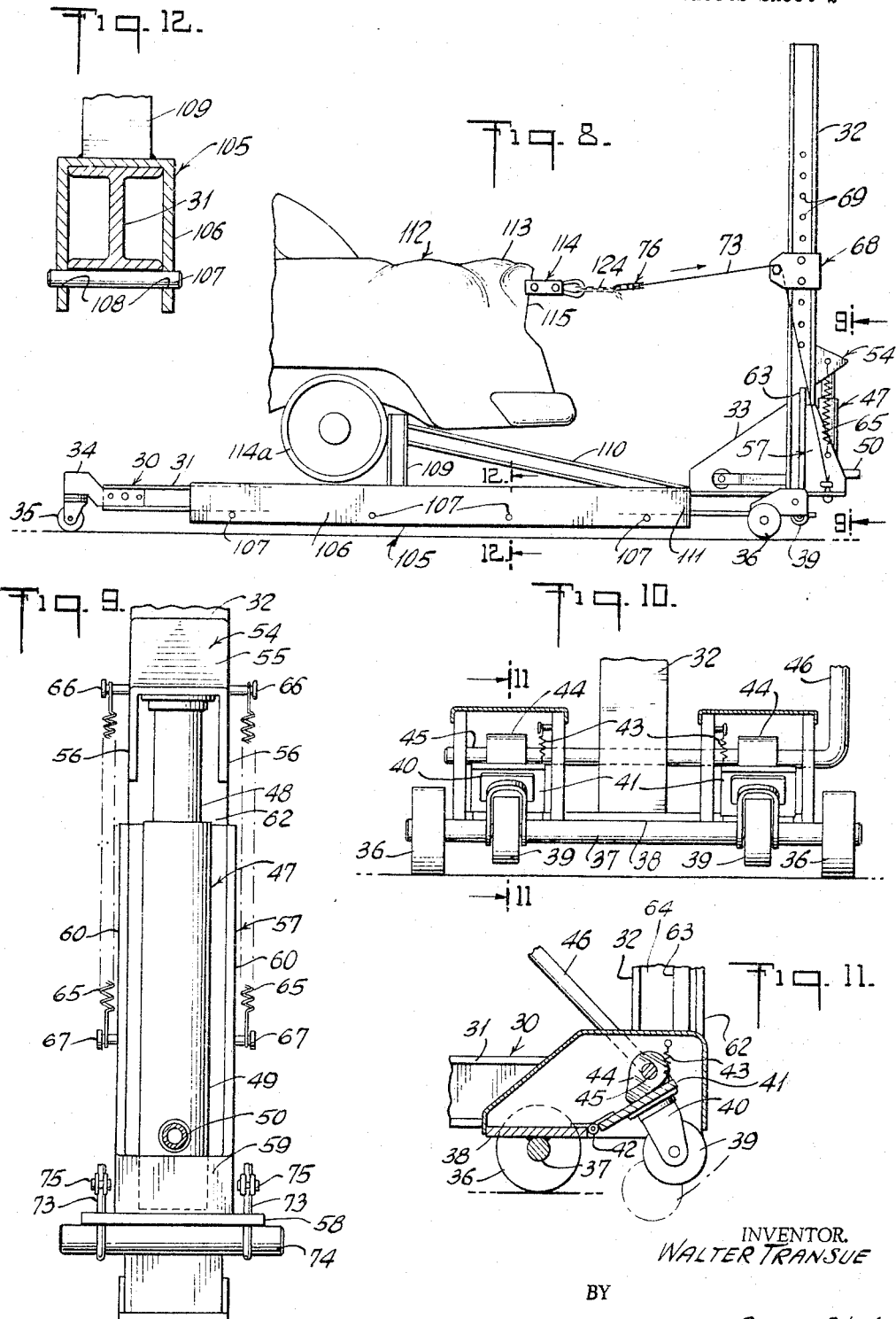

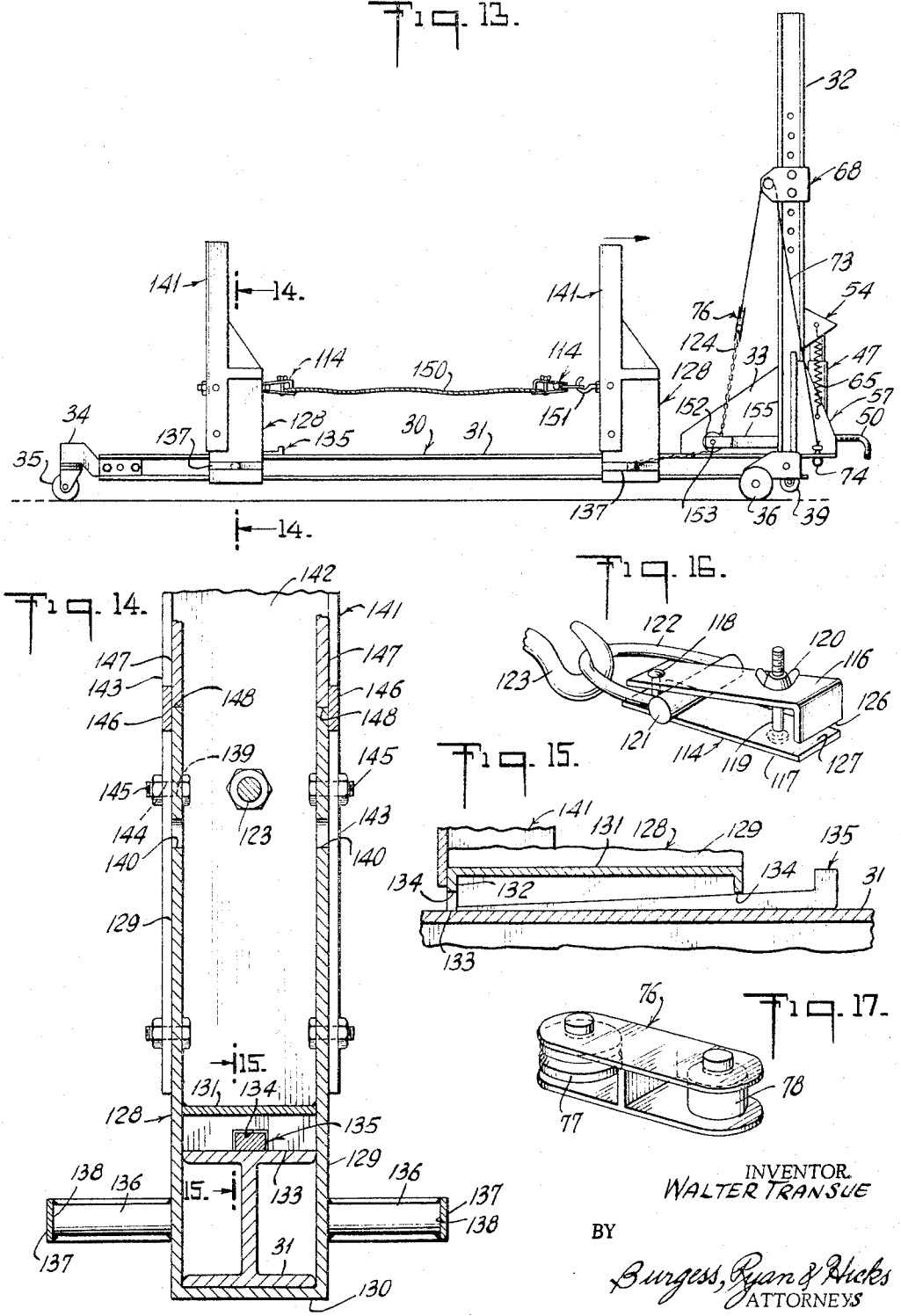

Oct. 4, 1966   W. TRANSUE   3,276,237
APPARATUS FOR STRAIGHTENING AUTOMOBILE BODIES
Filed Sept. 7, 1962   7 Sheets-Sheet 4
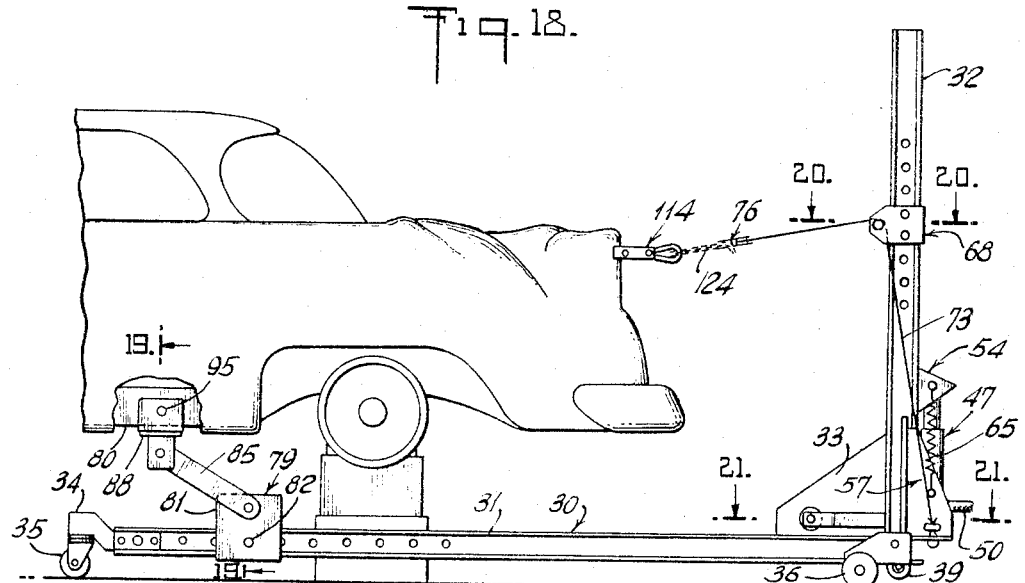
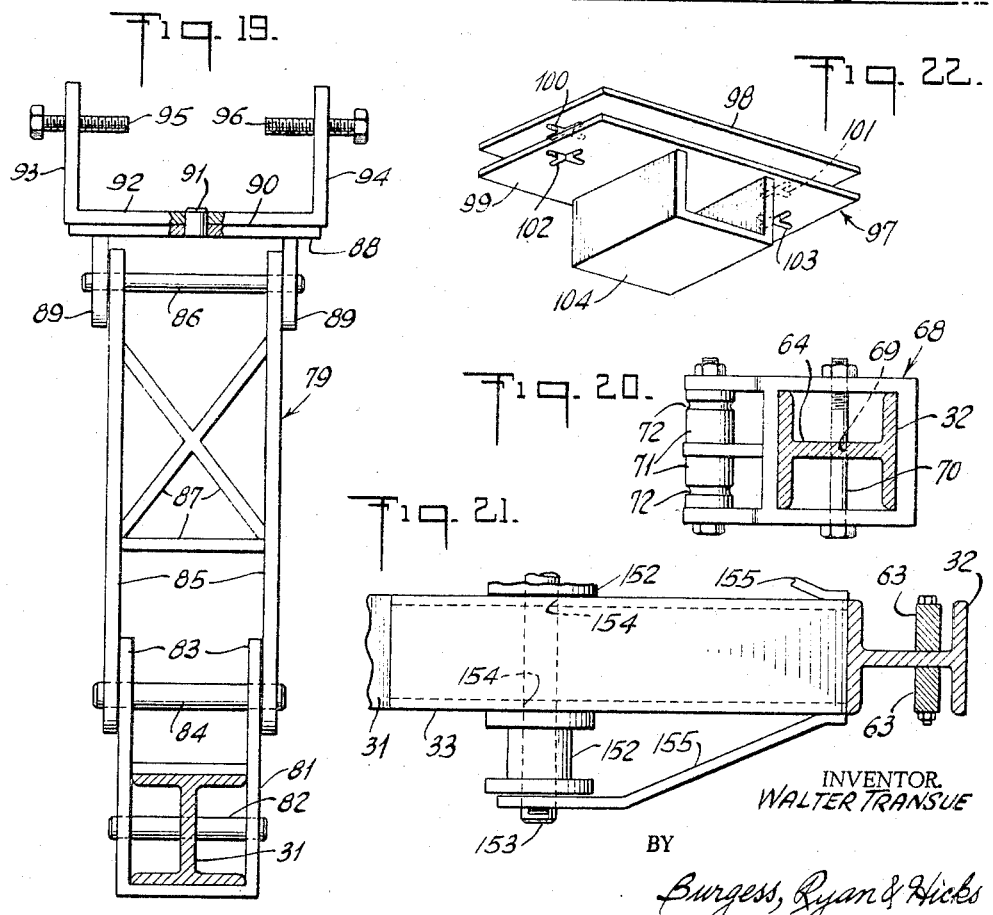
INVENTOR.
WALTER TRANSUE
BY
Burgess, Ryan & Hicks
ATTORNEYS

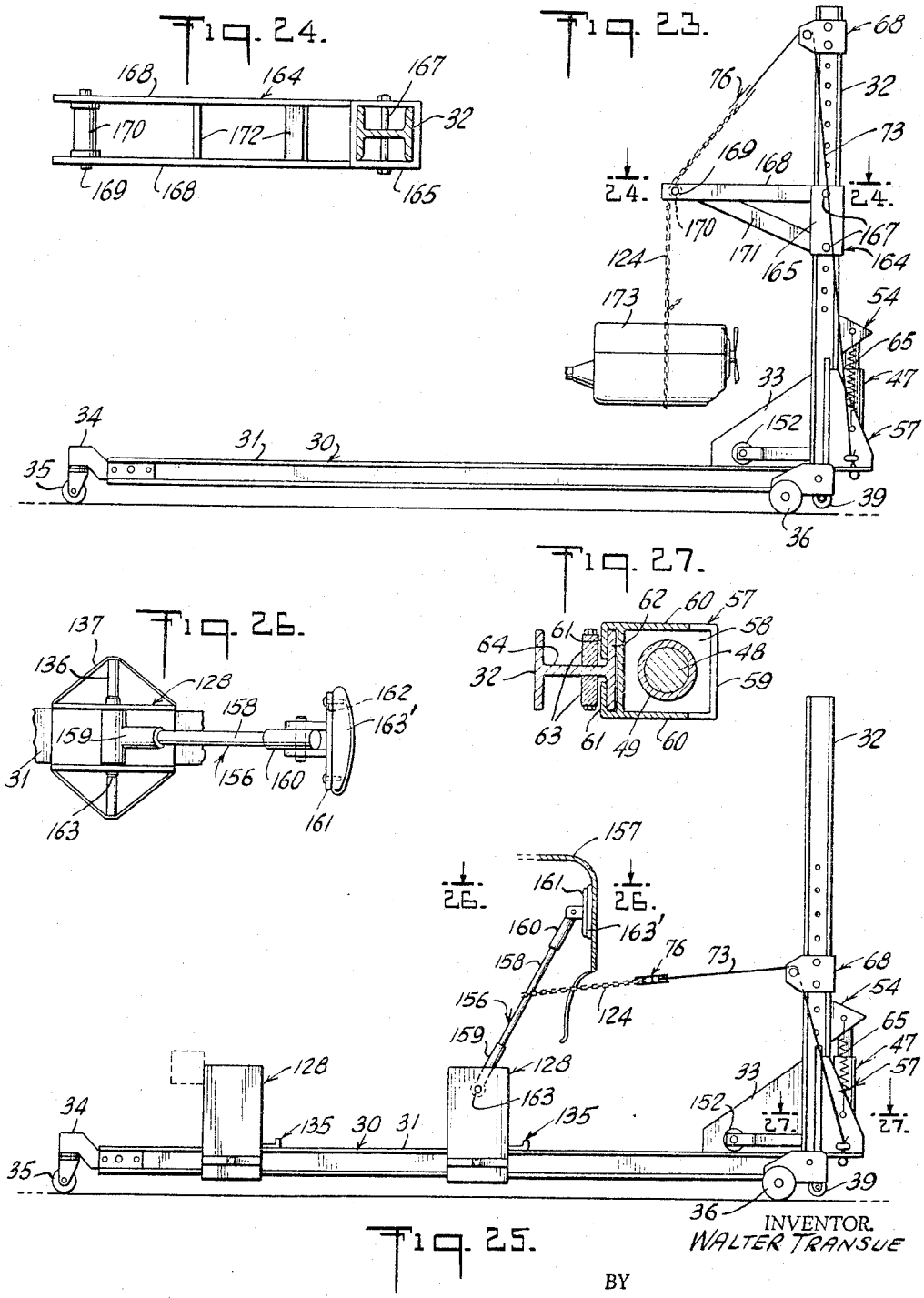

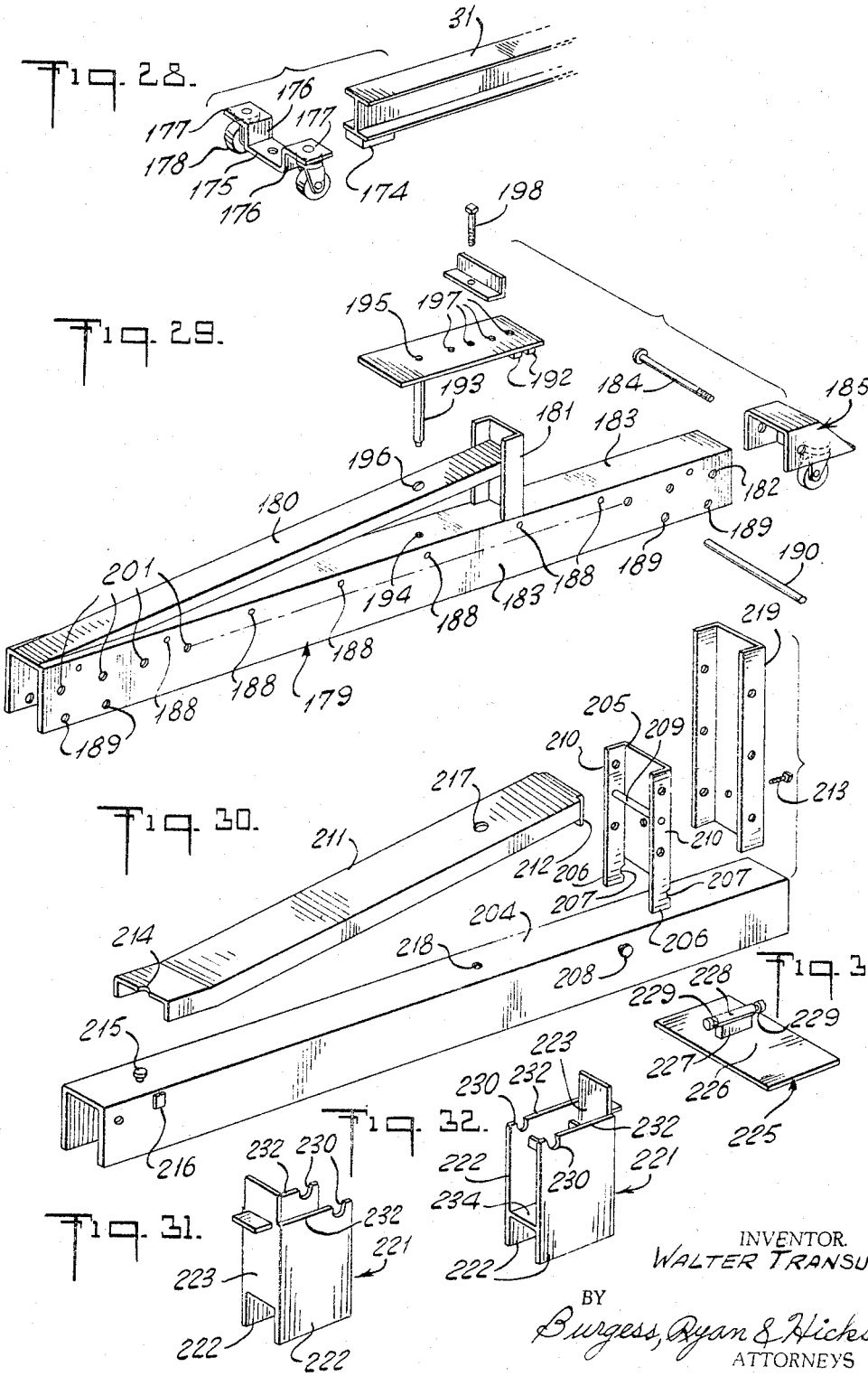

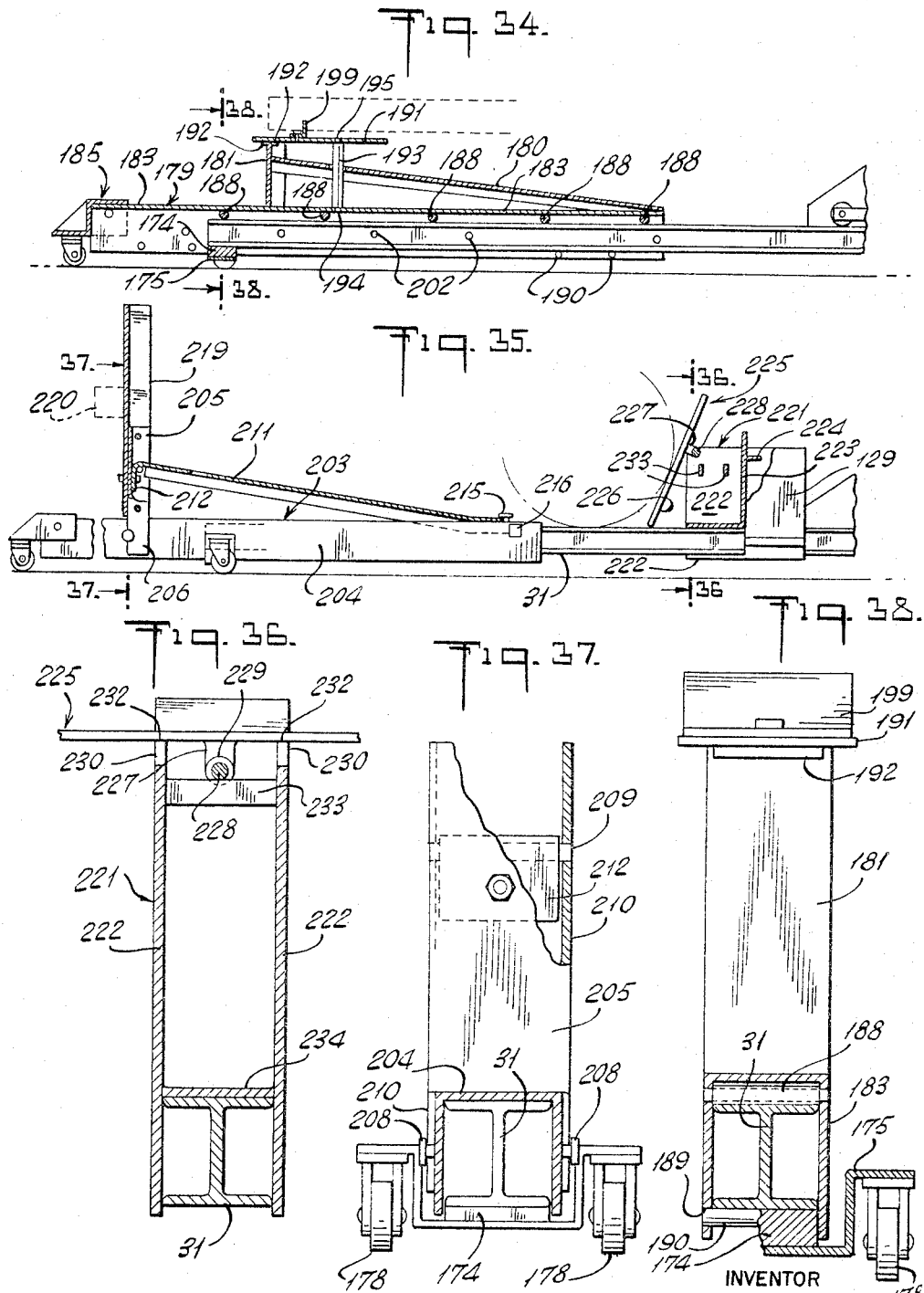

United States Patent Office 3,276,237
Patented Oct. 4, 1966

3,276,237
APPARATUS FOR STRAIGHTENING
AUTOMOBILE BODIES
Walter Transue, 1713 W. Main St., Stroudsburg, Pa.
Filed Sept. 7, 1962, Ser. No. 221,977
18 Claims. (Cl. 72—295)

This invention relates to a portable, manually operable tool for reshaping damaged portions of automobile bodies and frames.

It is an object of the invention to provide a versatile tool for applying bending and tension forces to deformed portions of automobile bodies in order to restore them to their proper shape.

It is a further object to provide such a tool having a hydraulic piston-and-cylinder arrangement for exerting the necessary bending power and easily adjustable means for applying the power to the work.

It is a further object of the invention to provide such a tool having accessories adapting it for use as a crane or hoist for lifting weights such as automobile engines.

Finally, it is an object to provide a basic framework for the tool which is adapted to receive any one of a number of accessory clamps and extension pieces useful in fitting the tool thus assembled to many different repair situations and positions.

Further objects of the invention will be obvious from the following description, read in conjunction with the accompanying drawings, in which FIG. 1 is a perspective view of the basic frame of the tool;

FIG. 2 is a perspective view of a pair of slidable brackets adapted for use on the basic frame;

FIG. 3 is a perspective view of a pair of extension pieces to be used with the brackets of FIG. 2;

FIG. 4 is a perspective view of a chock adapted for attachment to the basic frame;

FIG. 5 is a perspective view of a hoist attachment;

FIG. 6 is a perspective view of a clamp adapted to extend between the basic frame and a car body;

FIG. 7 is a perspective view of a pusher plate;

FIG. 8 is a side view of the tool shown pulling a damaged fender;

FIG. 9 is an end view of a portion of the basic frame taken on line 9—9 of FIG. 8;

FIG. 10 is an end view of an adjustable caster;

FIG. 11 is a side view of the adjustable caster taken on line 11—11 of FIG. 10;

FIG. 12 is a cross section on line 12—12 of FIG. 8;

FIG. 13 is a side view shown stretching a damaged piece of work;

FIG. 14 is a view on line 14—14 of FIG. 13;

FIG. 15 is a view on line 15—15 of FIG. 14;

FIG. 16 is a perspective view of a clamp adapted to grasp the edge of a sheet of metal;

FIG. 17 is a pulley;

FIG. 18 is a side view of the tool shown in use pulling a damaged metal fender;

FIG. 19 is a view on line 19—19 of FIG. 18;

FIG. 20 is a view on line 20—20 of FIG. 18;

FIG. 21 is a view on line 21—21 of FIG. 18;

FIG. 22 is a perspective view of a bolt-on anchor fitting;

FIG. 23 is a side view of the tool serving as a hoist;

FIG. 24 is a view on line 24—24 of FIG. 23;

FIG. 25 is a side view of the tool in use pressing out a dented fender from inside;

FIG. 26 is a top view of the pusher plate of FIG. 7;

FIG. 27 is a cross section on line 27—27 of FIG. 25;

FIG. 28 is an exploded partial perspective view of an alternate caster construction;

FIG. 29 is an exploded perspective view of an extension chock;

FIG. 30 is an exploded perspective view of an alternate construction of an extension chock;

FIG. 31 is a perspective view of an alternate post structure;

FIG. 32 is a perspective view of a second alternate post structure;

FIG. 33 is a perspective view of a pivoting chock plate;

FIG. 34 is a partial side view in section of the extension chock of FIG. 29;

FIG. 35 is a partial side view of the alternate extension chock of FIG. 30;

FIG. 36 is a section on line 36—36 of FIG. 35;

FIG. 37 is a section on line 37—37 of FIG. 35; and

FIG. 38 is a section on line 38—38 of FIG. 34.

As may best be seen in FIGS. 1 and 18, the basic frame 30 is comprised of a horizontal base beam 31 of I-shaped cross section. Welded to the base beam 31 is a vertical standard 32, also of I-shaped cross section. To strengthen the joint between these parts corner plate 33 is welded to these members. As an aid to the placement of the tool beneath a car body, the outer end of the base beam 31 bears a swivel caster mechanism 34 removably bolted thereto and adapted to allow rolling of that end over a level floor surface on wheel 35. The inner end of the base beam is supported during use by a pair of support roller 36 rotating on axis 37. Axis 37 is welded to a transverse plate 38, which is in turn welded to the bottom of the base beam 31. As an aid to movement of the tool during adjustment thereof a pair of swivel mounted auxiliary support wheels 39 may be provided. As best seen in FIGS. 10 and 11 the swivel mounts 40 of these wheels may be fastened to a hinged plate 41 rotatable about hinge 42 from the raised position of FIG. 11 to a horizontal position in which the auxiliary support wheels are as shown in dotted lines in FIG. 11. In the latter position the support rollers 36 are out of contact with the surface on which the tool rests. Consequently the inner end of the tool (the end to the right in FIG. 1) may be moved in any direction while supported on the swivel mounted auxiliary support wheels. Sideways moveemnt may be undesirable when the tool is in use, and for that reason the auxiliary support wheels may be raised at such time.

Motion of the auxiliary support wheels between the two positions indicated in FIG. 11 is controlled by springs 43 which tend to lift the hinged plate into the raised position and cams 44 which may be rotated about cam axis 45 to depress the hinged plate. Cam operating lever 46 allows manual rotation of the cams by the operator.

Power for the tool is provided by a hydraulic ram 47 comprising a piston 48 movable in a cylinder 49. Hydraulic fluid under pressure reaches the cylinder by a flexible hose 50. Pressure is applied to the fluid by the manual pump 51 when pump handle 52 is reciprocated. The pressure may be relieved by opening valve 53. The hydraulic ram and pump are of a type commercially available for use wherever pushing force is required. The tool which is the subject of the invention is designed to allow the use of these commercial rams. Sockets are provided so that the ram may be inserted in the tool or removed with ease for use elsewhere. No necessity for removing bolts exists.

As may best be seen in FIGS. 1 and 9, a fixed upper socket 54 is welded to the standard. The upper socket is comprised of upper plate 55 and triangular side plates 56. The upper plate slopes downwardly away from the standard so that its underside, together with the side plates, forms a socket suited to retaining the upper end of piston 48. The lower end of cylinder 49 rests in a vertically reciprocable carriage 57. The carriage comprises a bottom plate 58 welded to a carriage body. The carriage body is formed from a single metal sheet and comprises end plate 59 and side plates 60. The side plates have lips 61 which curl around flange 62 of the standard 32 (see FIG. 27). Vertical ribs 63 fastened to the web 64 of the standard form, with flange 62, channels which receive the lips 61 and guide the carriage 57 in its vertical motion.

Elevating springs 65 extend between upper pins 66 protruding from the upper socket 54 to lower pins 67 protruding from the carriage (see FIG. 9). These springs tend to raise the carriage on the standard toward an upper position. When the hydraulic pressure in the cylinder is eliminated by opening valve 53, the carriage will rise into the upper portion, compressing piston 48 into cylinder 49. By applying hydraulic pressure, the carriage may be driven downward under great force. This downward motion, transmitted to the work piece through cables and chains, is relied upon to pull the work piece into a desired shape.

An adjustable upper pulley bracket 68 (best seen in FIGS. 1 and 20) encircles standard 32 above upper socket 54. Web 64 is provided with a series of holes 69 adapted to receive bolts 70 passing through the upper pulley bracket. By this means the bracket may be locked at substantially any desired position along the length of the standard. The upper pulley bracket supports upper pulleys 71 on a horizontal axis. The upper pulleys have grooves 72 for the receperttion of wire rope 73. The ends of the wire rope pass down through holes in bottom plate 58, around bar 74 (see FIG. 9) and up through a second set of holes in the bottom plate. Clamps 75 clamp the ends of the wire rope to itself. By readjusting the clamps the length of wire rope employed may be varied. Free pulley 76 receives the middle of wire rope 73 on grooved sheave 77 and is equipped with a pulley bar 78 around which chain may be wrapped. For jobs requiring pulling in of a considerable length of wire rope 73 successive increments may be pulled in with hydraulic ram 47, the slack resulting from the return of the ram to collapsed position being taken up by readjusting clamps 75.

On most occasions a way must be found to anchor the tool to the body of the automobile. Several attachments have been provided for this purpose. FIGS. 6, 18 and 19 show a frame clamp for securing the machine to the box girders or frames 80 formed beneath many cars. The fra frame clamp comprises a slidable lower bracket 81 adapted to surround and slide along the base beam 31. Locking pin 82 passes through a hole in the web of the base beam, holding the lower bracket in place. Ears 83 extend above the base beam and support lower hinge pin 84. Bars 85, supported pivotally at the lower end on the lower hinge pin, extend upward to upper hinge pin 86. Braces 87 hold the bars together. Turntable 88 bears ears 89 transfixed by the upper hinge pin. Projecting upward from the top surface 90 of the turntable is a pivot pin 91 which projects through a hole in clamp plate 92. Rising from the clamp plate 92 are ears 93 and 94, each of which carries a bolt, 95 and 96 respectively, in a threaded hole. By tightening the bolts on the car frame the clamp plate may be secured thereto. The combination of pivoted bars 85 with the turntable 88 allows the clamp plate to be raised and lowered and rotated to any desired position. As seen in FIG. 18, a car supported on blocks is having its rear fender pulled by the tool. The weight of the car helps hold down the base beam 31 as tension is applied, since the force transmitted to the base beam by bar 85 has both a downward and a horizontal component.

Some automobiles lack conveniently placed frame members suitable for clamping. In these an anchor member 97 (see FIG. 22) may be used. The anchor member comprises an upper plate 98 and a lower plate 99. Cross shaped holes 100 and 101 pierce the upper plate and similar holes 102 and 103 are provided in the lower plate. In use, a pair of holes is drilled through the sheet metal of the underside of the car and bolts are passed through the holes 100 and 101, through the holes in the car, and through holes 102 and 103. These bolts, when nuts are threaded thereon and tightened, secure the upper plate above the sheet metal and the lower plate below it. The lower plate bears a downwardly projecting false frame member 104 to which clamp plate 92 may be secured.

FIGS. 4, 8 and 12 show a removable chock which may be attached to the base beam 31 and which serves to brace the tool against any convenient part of the car, such as the wheel. The chock 105 also serves to increase the rigidity of the base beam when heavy strains are exerted on the tool. As best seen in FIGS. 4, 8 and 12, chock 105 is comprised of channel 106 of U-shaped cross section. The channel may be dropped down over the base beams 31 and secured thereto by pins 107, passed beneath the base beam 31 through a series of equally spaced holes 108 in the channel. Welded to the top surface of channel 106 is vertical post 109 comprised of a length of I-beam. The post is supported near its upper end by brace 110, also a length of I-beam, which extends to one end 111 of the channel 106. End 111, as seen in FIG. 8, abuts corner plate 33, and is thus fixed against longitudinal motion relative to the base beam.

In use chock 105 may be braced against any sturdy and convenient portion of the automobile. In FIG. 8 an automobile 112 is shown having its rear left fender 113 pulled into shape. Post 109 is shown braced against the rear tire 114a, which rests upon channel 106. The weight of the car is employed to hold down the base beam and resist the tendency for the support rollers to rise off the floor as tension is exerted on the fender. In FIG. 8 a clamp 114 is shown gripping the edge 115 of the damaged metal of fender 113. The clamp is seen best in FIG. 16. An upper jaw 116 is loosely fastened to a lower jaw 117 by a rivet 118. Bolt 119 passes through holes in the jaws and is threaded into wing nut 120. Clamp bar 121 is welded to staple 122 which may be engaged by hook 123 on one end of chain 124. The upper and lower jaws converge at the end where rivet 118 is located. As tension is exerted on the staple 122 by the hook 123, the clamp bar forces the portions of the upper and lower jaws adjacent the rivet apart. The bolt 119 and wing nut 120 serve as a fulcrum and the pivotal motion which results forces upper gripping surface 126 toward lower gripping surface 127. A sheet of metal between these surfaces will be grasped tightly and pulled.

FIGS. 2, 3, 13, 14 and 15 illustrate various uses for sliding standards 128. The sliding standards are made up of side plates 129 connected by a bottom plate 130 and a top plate 131. The ends 132 of the top plate are bent downward and have lower edges 133. The lower edges 133 together with the bottom plate 130 and portions of the side plates 129 define rectangular openings which are dimensioned to receive the base beam 31, making a sliding fit therewith. Notches 134 in lower edges 133 are adapted to receive a wedge 135 which may be hammered into place to lock the standard at a desired position along the base beam 31.

In some situations it is desirable to use the power of the hydraulic ram to pull the sliding standard 128 along the base beam 31, as shown in FIG. 13, for example. For this reason anchor posts 136 are welded to the side plates 129 and project horizontally therefrom. Reinforcing straps 137 extend from the side plates to the outer ends 138 of the anchor posts and prevent bending thereof. The upper portions of the side plates 129 are provided with bolt holes 139 and pivot hole 140 (see FIG. 2), the uses of which will be described below.

Extension posts 141 fit the sliding standards 128 and may be bolted thereto. They may serve as braces against parts of an automobile too high off the ground to be reached by the sliding standards. They also may serve as anchor points for hooks or other accessories. As best seen in FIGS. 3, 13 and 14, extension posts 141 are comprised of end plate 142 and side plates 143 welded perpendicular thereto to form a channel iron of U-shaped cross section. The dimensions of the channel iron thus formed are such that side plates 143 clasp side plates 129 of the sliding standard. Bolt holes 144 in the side plates 143 match bolt holes 139 in the sliding standard and bolts 145 may be employed to fasten these structures together. As a means of strengthening the extension posts projecting strips 146 extend outwardly of the edge of side plates 143 and are welded to triangular reinforcing braces 147, the lower edges 148 of which abut the side plates 129 of the sliding standards. Anchor holes 149 may be drilled through end plate 142 to serve as attachment points for hooks or other fastening members.

FIG. 13 shows the sliding standards 128 with extension posts 141 attached, being used to pull the wrinkles out of a sheet metal strip 150 held between clamps 114, one of which is shown gripped by a hook 151 which is bolted to an extension post. The left hand sliding standards is fastened by wedge 135 to the base beam 31. That on the right is free to slide on the base beam. Motion is produced by means of tension in chain 124 attached to anchor posts 136. The chain is fastened to wire rope 73 by the free pulley 76. The desired direction of pull is achieved by passing the chain around lower pulleys 152 (see FIG. 21). The lower pulleys rotate on axle 153 passing horizontally through holes 154 in corner plate 33. Reinforcing straps 155 support the ends of the axle against bending. By passing chain 124 around lower pulleys 152 and then upward, downward pulls may be effected, as where it is desired to pull a bumper downward. In addition, if the chain is used to pull the sliding standard 128 farthest from the lower pulleys 152 (the left hand sliding standard in FIG. 13) while the closer standard is locked, the tool may be used as a giant vise or clamp.

FIGS. 7, 25 and 26 show a pusher arm 156 for use in pushing out dents from inside a car body 157. The pusher arm comprises a bar 158 with a lower hinge fitting 159 and an upper hinge fitting 160 on opposite ends thereof. The lower hinge fitting pivots about a removable axle 163 which is carried in pivot holes 140 of one of the sliding standards 128. The bar 158 is loosely fitted in the sockets of the upper and lower hinge fittings. A series of bars of different lengths may thus be supplied to reach dents of different heights. The loose fitting also enables the upper hinge fitting to rotate about the axis of the bar 158. Pivotally attached to the upper hinge fitting is push plate 161. The push plate is pierced by nail holes 162. By means of nails passing through the nail holes a wood block 163' may be attached to the pusher plate (see FIG. 26). Such a block is easily shaped to fit the contour of a fender, for example, when the pusher arm is in use. In appropriate cases, as where the sheet metal being straightened is essentially flat in its straightened form, the wood block may be omitted (see FIG. 25).

In use the sliding standard 128 with the pusher arm attached is secured at a desired location along the base beam 31 and the push plate is located behind the dent. Chain 124 is looped around the bar 158 and tension is applied until the dent is pushed out. By means of the pivotal connections between the bar 158, the upper hinge fitting 160, and the push plate 161, the face of the push plate may pivot so as to be flat against the surface being straightened.

FIGS. 5, 23 and 24 show a hoist arm 164 which may be fitted to standard 32, converting the tool into a hoist for such purposes as lifting motors from automobiles. The hoist arm is comprised of a sleeve 165 which fits slidably around standard 32. Bolt holes 166 in the side of the sleeve allow it to be locked at a desired height on the standard by means of bolts 167 passing through selected holes 69 in the standard. Horizontal arms 168 extend from the sleeve 165 and support hoist axle 169 at their outer ends. Hoist pulley 170 rotates on the hoist axle. Brace bars 171 extend from the sleeve to the ends of the horizontal arms 168 and support them against bending. Struts 172 lend further rigidity to the structure. FIG. 23 shows the tool being used to lift an automobile engine 173. The engine is suspended from chain 124 which passes over hoist pulley 170 to free pulley 76, which is raised by tension in wire rope 73. The upper pulley bracket 68 is located at the highest point on standard 32 for this operation.

In some situations it is desirable to extend the base beam 31, and for this purpose a modified form of chock 105 may be employed. FIGS. 34 and 35 show two such modified constructions. In FIGS. 34 and 35 base beam 31 has been fitted with the alternative caster construction of FIG. 28. This caster construction comprises a spacer block 174 fastened to the underside of base beam 31 at the outer end thereof. Removably bolted to the underside of the spacer block is strap 175 bearing wings 176 extending laterally of the base beam 31 and having horizontal segments 177. Attached to the underside of each horizontal segment is at swivel caster wheel 178. These wheels serve the same purpose as the single wheel 35 of the FIG. 1 construction, supporting the outer end of the base beam during adjustment of the tool beneath an automobile.

The extension chock 179 of FIGS. 29 and 34 is similar in construction to chock 105 of FIG. 4, except that brace 180 and post 181 are constructed of channel iron having a U-shaped cross section and that certain holes are provided for auxiliary fittings. Holes 182 at the outer end of the channel 183 receive bolt 184, which serves to attach cap 185. Horizontal shelf 186 projects from the cap and supports swivel mounted wheel 187, so that the outer end of the channel will slide freely on the floor when extended.

The extension chock 179 is designed to remain in place on base beam 31 and to be extended or retracted as desired. Such movement is facilitated by a plurality of horizontal rollers 188 journaled in holes cut in the sides of the channel 183 which ride on top of base beam 31. Further holes 189 are adapted to receive pins 190 which pass beneath the base beam 31. Relative motion of base beam 31 and extension chock 179 may be prevented by a bolt passing through one of the holes 20' in the chock and holes 202 in the base beam.

Extension chock 179 may be used as a brace in the same manner as chock 105. It is also adapted to receive an auxiliary platform to support a car axle or frame, as shown in FIG. 34. Such support may be desired as a means of holding the tool in place and bracing it against the car. As may best be seen in FIG. 29, the auxiliary platform is comprised of a horizontal plate 191 one end of which rests on the top of post 181. The plate is steadied on the post by two metal tabs 192 welded to its under surface. These tabs lie on either side of the top end of the post and prevent slipping of the plate. Support rod 193 has end portions of reduced diameter, the lower stepped in hole 194 in channel 183 and the upper in hole 195 in the plate 191. Hole 196 in brace 180 allows passage of the support rod through the brace, as well as serving to steady the support rod.

A further series of tapped holes 197 in plate 191 receive bolt 198 which fastens angle iron 199 to the top surface of the plate. FIG. 34 shows, in dotted lines, a frame member 200 of a car resting on the auxiliary platform with angle iron 199 braced against the frame member.

FIGS. 30 and 35 show an alternate construction of an extension chock. Extension chock 203 is made up of three components which may be disassembled. This is an advantage in some situations where the chock must be placed beneath an automobile. With the extension chock of FIG. 35 the pieces may be assembled while the tool is in place. The extension chock 203 comprises a channel 204 similar to channel 183 of FIG. 29. Removable post 205 is constructed of channel iron and has ears 206 sized to fit against the sides of channel 204, when the removable post is in place. Notches 207 in the ears engage studs 208 projecting from the sides of channel 183. Transverse rod 209 extends horizontally between the sides 210 of the removable post.

Removable brace 211 bears depending tongue 212 which is adapted to slide down between the transverse rod 209, and the removable post 205. Bolt 213 fastens these elements together. The other end of removable brace 211 bears notch 214 which slides beneath the head of stud 215. Welded-on projections 216 aid stud 215 in absorbing the thrusting force of the brace. Holes 217 and 218 in the extension chock are adapted to receive support rod 193 when desired.

An extension post 219 is shown adapted to be bolted to removable post 205 when greater height is needed to brace the chock against a frame member 220.

FIGS. 31–33 and 35 show a support stand 221 having depending walls 222 adapted to clasp either side of base beam 31. In use the support stand abuts a sliding standard 128 and transmits thrust to said standard. The latter attachment may be secured to base beam 31 where desired, as explained above in connection with FIG. 15. Therefore, support stand 221 may also be located in the most convenient place along the base beam.

The support stand 221 is of U-shaped cross section taken on a horizontal plane, having side walls 222 joined to a vertical end wall 223. Tongue 224 projects horizontally from the end wall in an outward direction and is less wide than the end wall. It is thus adapted to fit between side plates 129 of sliding standard 128, as shown in FIG. 35. This engagement prevents sideways displacement of the support stand, locking it to the sliding standard.

FIG. 33 shows the underside 226 of a thrust plate 225 while FIG. 35 shows the thrust plate in use in combination with the support stand 221. Projecting from the underside of the thrust plate is block 227 supporting pivot bar 228. The pivot bar is formed with circumferential grooves 229 adjacent its ends. These cooperate with slots 230 is side walls 222 to support the thrust plate against the support stand in the position of FIG. 35. That figure shows an automobile wheel 231 resting on base beam 31 and braced against the thrust plate. The pivotal mounting of the thrust plate allows it to lie flat against the surface supported.

The thrust plate 225 may be used in conjunction with the support stand 221 in a second position, shown in FIG. 36, which differs from the position shown in FIG. 35. In the second position the thrust plate is turned sideways and rests on the upper edges 232 of the side walls 222 of the support stand. In this position the thrust plate can support the underside of a car body. The thrust plate is sustained in place by cross struts 233 which extend across the space between side walls 222 below their upper edges 232. The cross struts engage circumferential grooves 229 in pivot bar 228 and prevent sliding of the thrust plate off the support stand. Floor plate 234 stiffens the walls of the support stand and rests on the upper surface of base beam 31.

It will be apparent from the above description that the tool which is the subject of the present invention is versatile, easily portable, and may be powered by a hydraulic ram of a type now in wide use. The ram may easily be removed for use elsewhere. By means of suitable pulleys the force of the ram may be applied to the work by wire rope and chain from nearly any desired direction. The ram need not be moved about during adjustment of the device. Since the hydraulic pump is connected to the tool by a long flexible hose the operator can stand clear of the tool during use. This lessens the danger of his being hit should the chain pull loose from the automobile. In addition, the operator can stand close to the work to observe the effects of the applied force or to apply heat or hammer blows thereto.

The invention having been fully described, the following is claimed:

1. A tool for repairing automobile bodies comprising
   (a) a horizontal base beam adapted to extend parallel with and close to a floor on which the tool rests;
   (b) a vertical standard attached near an inner end of the base beam;
   (c) a fixed socket attached to the vertical standard and adapted to receive an end of a hydraulic ram piston-and-cylinder assembly;
   (d) a carriage vertically movable along the standard and adapted to receive a second end of a hydraulic ram piston-and-cylinder assembly, the position of the carriage and the fixed socket being such that expansion of the hydraulic ram piston-and-cylinder assembly drives the carriage in a first direction;
   (e) means tending to move the carriage in a second direction opposite to the first direction upon contraction of the hydraulic ram piston-and-cylinder assembly;
   (f) an upper pulley bracket movable along the standard to a desired position;
   (g) means for locking the upper pulley bracket to the standard in the desired positions;
   (h) an upper pulley supported by the upper pulley bracket; and
   (i) a slender flexible tension member fastened to the carriage and passing over the upper pulley, said member adapted to transmit motion of the carriage to a workpiece.

2. The tool of claim 1 comprising
   (j) a caster mechanism at the outer end of the base beam adapted to support said outer end above a surface on which the tool rests;
   (k) a pair of support rollers at the inner end of the base beam adapted to support the inner end above said surface and to prevent tipping of the standard sideways, said support rollers being rotatable about an axis perpendicular to the plane defined by the base beam and the standard.

3. The tool of claim 2 comprising a pair of auxiliary support wheels on swivel mounts placed adjacent the support rollers and movable between an upper and a lower position, said auxiliary support wheels when in the upper position being out of contact with a surface on which the tool rests and said auxiliary support wheels when in the lower position contacting said surface and supporting the inner end of the tool with the support rollers lifted out of contact with said surface.

4. The tool of claim 1 comprising a chock, said chock comprising
   (j) a channel having a U-shaped cross secttion adapted closely to overlie and surround a segment of the base beam;
   (k) means for locking the channel relative to the base beam; and
   (l) an upstanding post attached to the channel adapted to contact a portion of an automobile and prevent motion of the tool relative to the automobile 5. The tool of claim 1 comprising a frame clamp, said frame clamp comprising
   (j) a lower bracket surrounding the base beam;
   (k) means for locking the lower bracket to the base beam at a selected location thereon;
   (l) a bar structure hinged to the lower bracket at the lower end of said bar structure and swingable in a vertical plane containing the base beam;
   (m) a turntable hinged to the bar structure at the upper end of said bar structure and swingable relative to the bar structure in a vertical plane containing the bar structure;
   (n) a clamp structure rotatable on the turntable about an axis perpendicular to the axis of the hinge uniting the bar structure and the turntable;

(o) means for fastening the clamp structure to frame members on an automobile.

6. The tool of claim 1 comprising a sliding standard, said sliding standard comprising
(j) a bottom plate;
(k) side plates rising from opposed edges of the bottom plate;
(l) a top plate parallel with the bottom plate, extending between the side plates, the top plate, bottom plate, and side plates defining a channel adapted to receive the base beam and form a sliding fit therewith;
(m) means for locking the sliding standard to the base beam at a desired position thereon;
(n) portions of the side plates extending above the top plate; and
(o) anchor means for connecting the sliding standard to a tension member for pulling the sliding standard along the base beam.

7. The tool of claim 6 comprising an extension post, said extension post comprising
(p) an extension post end plate;
(q) extension post side plates connected to the extension post end plate and forming with the extension post end plate a channel of U-shaped cross section; and
(r) means for fastening the extension post to the portions of the side plates of the sliding standard which extend above the top plate of sliding standard.

8. The tool of claim 6 comprising a pusher arm, said pusher arm comprising
(p) a bar;
(q) lower hinge means on the bar for securing the pusher arm to the portions of the side plates of the sliding standard which extend above the top plate of the sliding standard, said lower hinge means permitting rotation of the bar above an axis perpendicular to the plane which contains the base beam and the standard;
(r) a push plate; and
(s) upper hinge means for securing the push plate to the bar for rotation about an axis parallel to the axis of rotation of the lower hinge means.

9. The tool of claim 1 comprising a hoist arm, said hoist arm comprising
(j) a sleeve formed to surround the standard and slide thereon;
(k) means for locking the sleeve to the standard at a desired position thereon;
(l) an arm attached to the sleeve extending laterally of the standard in the plane defined by the standard and the base beam on the same side of the standard as the outer end of the base beam; and
(m) a hoist pulley adapted to receive the tension member supported by the outer end of the arm for rotation about a horizontal axis.

10. A frame clamp for fastening an automobile body straightening tool to an automobile frame member, said tool having a horizontal base beam adapted to extend under the automobile, said frame clamp comprising
(a) a lower bracket surrounding the base beam;
(b) means for locking the lower bracket to the base beam at a selected location thereon;
(c) a bar structure hinged to the lower bracket at the lower end of said bar structure and swingable in a vertical plane containing the base beam;
(d) a turntable hinged to the bar structure at the upper end of said bar structure and swingable in a vertical plane containing the bar structure;
(e) a clamp structure rotatable on the turntable about an axis perpendicular to the axis of the hinged uniting the bar structure and the turntable; and
(f) means for fastening the clamp structure to frame members on an automobile.

11. The tool of claim 1 comprising an extension chock, said extension chock comprising
(j) a channel having a U-shaped cross section adapted closely to overlie and surround a segment of the base beam with a portion of the channel projecting beyond the outer end of the base beam in an extended position;
(k) means for locking the channel relative to the base beam; and
(l) an upstanding member attached to the channel adapted to contact a portion of an automobile and prevent motion of the tool relative to the automobile.

12. The tool of claim 11 comprising means to lock the channel to the base beam in both the extended position and, alternatively in a retracted position in which the major portion of the length of the channel overlies the base beam.

13. The tool of claim 1 comprising a chock, said chock comprising
(j) a first member slidable along the length of the base beam;
(k) locking means for locking the first member relative to the base beam, and
(l) contact means attached to the first member for contacting a portion of an automobile and preventing motion of the tool relative to the automobile.

14. The tool of claim 13 wherein the first member comprises a channel of U-shaped cross section embracing the base beam and wherein the contact means comprises a vertical post and a brace member extending between the channel and the post.

15. The tool of claim 14 comprising a plurality of rollers interposed between the base beam and the first member adapted to support the first member during sliding of the first member relative to the base beam.

16. The tool of claim 14 wherein the vertical post, brace member, and channel are separate structures with fitttings allowing their assembly together.

17. The tool of claim 1 comprising a support stand and thrust plate, said support stand comprising means for positioning it on the base beam, engaging means for engaging a sliding standard, and support means for contacting and supporting a thrust plate.

18. The tool of claim 17 wherein the support means comprises a pair of spaced notches and wherein the trust plate bears a pivot bar adapted to enter the notches and rotate therein.

References Cited by the Examiner

UNITED STATES PATENTS

| | | | |
|---|---|---|---|
| 1,676,263 | 7/1928 | Hawkins | 153—32 |
| 2,451,307 | 10/1948 | South | 72—705 |
| 2,597,103 | 5/1952 | Johnson et al. | 153—32 |
| 2,979,102 | 4/1961 | Ferguson et al. | 153—32 |
| 2,998,837 | 9/1961 | Luedicke et al. | 153—32 |
| 3,027,930 | 4/1962 | Padgett | 153—32 |
| 3,029,859 | 4/1962 | Grant | 153—32 |
| 3,034,563 | 5/1962 | Gaspar et al. | 153—32 |
| 3,053,305 | 9/1962 | Lincourt | 153—32 |
| 3,108,629 | 10/1963 | Jenkins | 72—705 |
| 3,122,194 | 2/1964 | Bronson et al. | 72—705 |

OTHER REFERENCES

"Padget Puller," Publication, O'Neal Steel Products Co,. Birmingham 2, Alabama, 1961.

"Straighten Out Your Profits," an information pamphlet distributed by the Smith Portable Frame and Body Machine Co., P.O. Box 936, Grand Prairie, Texas, received in the Patent Office June 1, 1959.

CHARLES W. LANHAM, *Primary Examiner.*

W. H. JUST, *Assistant Examiner.*